United States Patent [19]

Sekiya et al.

[11] Patent Number: 5,025,310
[45] Date of Patent: Jun. 18, 1991

[54] CLOCK PULSE GENERATOR CAPABLE OF BEING SWITCHED TO PROCESS BOTH STANDARD AND NON-STANDARD TELEVISION SIGNALS

[75] Inventors: Hiroshi Sekiya; Toshiyuki Kurita, both of Yokohama; Nobufumi Nakagaki, Tokyo; Toshinori Murata, Yokohama, all of Japan

[73] Assignees: Hitachi, Ltd., Tokyo; Hitachi Video Engineering, Inc., Yokohama, both of Japan

[21] Appl. No.: 497,973

[22] Filed: Mar. 23, 1990

[30] Foreign Application Priority Data

Mar. 23, 1989 [JP] Japan ............................... 1-69382
Jul. 19, 1989 [JP] Japan ............................... 1-184686

[51] Int. Cl.⁵ ...................... H04N 9/45; H04N 9/455; H04N 9/64; H04N 5/04
[52] U.S. Cl. ........................... 358/19; 358/21 R; 358/148; 358/13
[58] Field of Search .................. 358/19, 13, 21 R, 148

[56] References Cited

U.S. PATENT DOCUMENTS 3,904,823  9/1975  Van Straaten ............... 358/148
4,613,827  9/1986  Takamori et al. ............ 358/19
4,847,678  7/1989  McCauley ................... 358/19
4,860,090  8/1989  Murata et al. ............... 358/13 C Primary Examiner—James J. Groody
Assistant Examiner—Wendy R. Greening
Attorney, Agent, or Firm—Antonelli, Terry, Stout & Kraus

[57] ABSTRACT

A clock pulse generator has a first clock pulse generator for generating a burst lock clock pulse signal synchronized with a color burst signal contained in a video signal; a second clock pulse generator for generating a line lock clock pulse signal synchronized with a horizontal synchronizing signal contained in the video signal; a detection circuit for detecting whether or not the video signal is a standard signal; and a phase control circuit for synchronizing the phase of the line lock clock pulse signal with the phase of the burst lock clock pulse signal when the detection circuit determines that the video signal is a standard signal. The line lock clock pulse signal is supplied to a synchronizing signal generator, a selected one of the burst lock clock pulse signal and the line lock clock pulse signal is supplied to a signal processing circuit when the detection circuit determines that the video signal is a standard signal, and the line lock clock pulse signal is supplied to the signal processing circuit when the detection circuit determines that the video signal is a non-standard signal.

12 Claims, 14 Drawing Sheets

FIG. IA
PRIOR ART
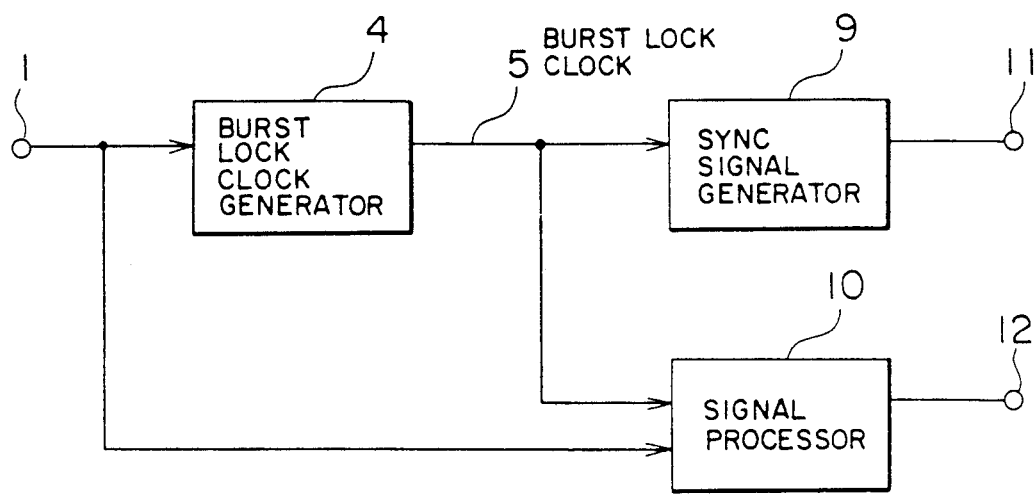
FIG. IB
PRIOR ART
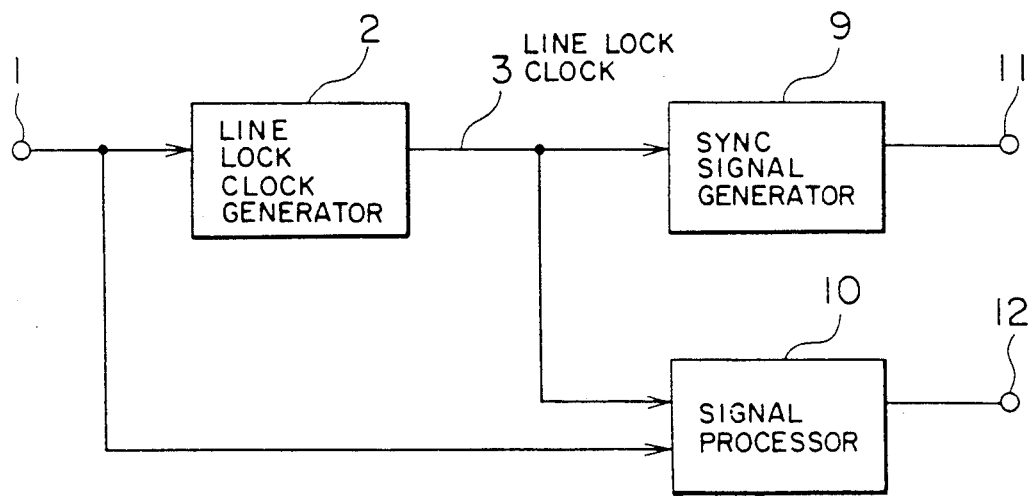

F I G. 14
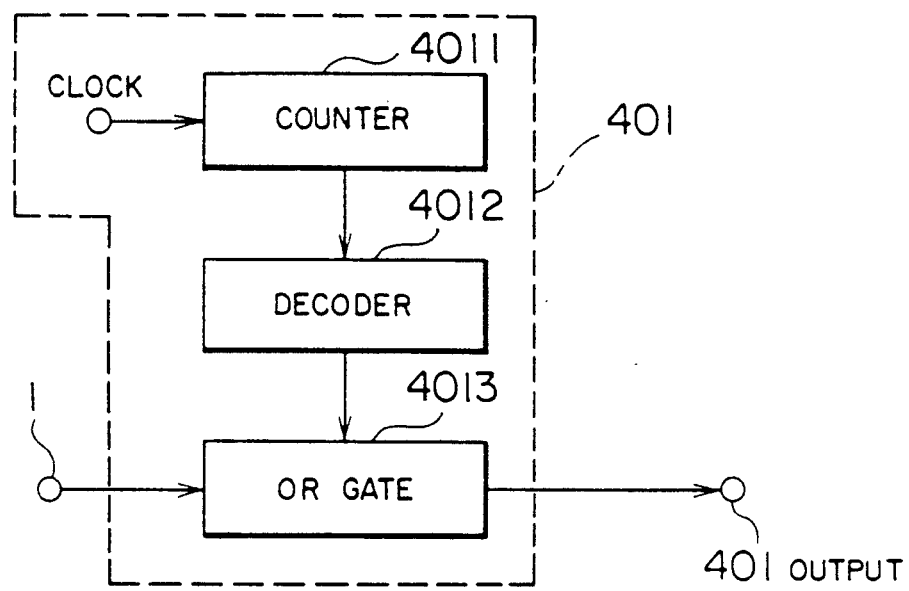

CLOCK PULSE GENERATOR CAPABLE OF BEING SWITCHED TO PROCESS BOTH STANDARD AND NON-STANDARD TELEVISION SIGNALS

BACKGROUND OF THE INVENTION

The present invention relates to a clock pulse generator for use in digital television receivers, video tape recorders and the like, and, particularly, relates to a clock pulse generator for use in horizontal synchronizing signal generation circuits and signal processing circuits.

FIGS. 1A and 1B are block diagrams respectively showing conventional clock pulse generators.

In FIGS. 1A and 1B, the reference numeral 1 designates a video signal input terminal, 2 a line lock clock pulse generation circuit, 3 a line lock clock pulse signal (generated in synchronism with a horizontal synchronizing signal contained in an input video signal), 4 a burst lock clock pulse generation circuit, 5 a burst lock clock pulse signal (generated in synchronism with a color burst signal contained in the video signal), 9 a synchronizing signal generation circuit, 10 a signal processing circuit, 11 a synchronizing signal output terminal and 12 a video signal output terminal.

First, the circuit shown in FIG. 1A is described hereunder.

The burst lock clock pulse generation circuit 4 generates a stable burst lock clock pulse signal 5 by use of a quartz oscillator (not shown) in synchronism with a color burst signal contained in a video signal entering at the video signal input terminal 1. The input video signal is a signal according to a standard television broadcasting system (hereinafter called "standard signal"). In an NTSC system, the frequency (fsc) of the color burst signal contained in the standard signal and the frequency ($f_H$) of the horizontal synchronizing signal have the following relation.

$$fsc = \frac{455}{2} f_H \quad (1)$$

Next, the synchronizing signal generation circuit 9 receives the burst lock clock pulse signal 5 supplied from the burst lock clock pulse generation circuit 4 and generates a synchronizing signal by using the relation expressed by the equation (1).

The signal processing circuit 10 receives both the video signal supplied through the video signal input terminal 1 and the burst lock clock pulse signal 5 supplied from the burst lock clock pulse generation circuit 4 and performs signal processing on the video signal by using the relation expressed by the equation (1) to thereby improve the picture quality of the video signal. As an example of such a conventional circuit for improving the picture quality of the video signal, for example, there is that disclosed in JP-A-62-268274 specification.

That disclosed in the above JP-A-62-268274 specification relates to a horizontal synchronizing regeneration circuit having a horizontal synchronizing oscillation frequency fine tuning delay circuit arranged in front of an oscillation circuit. The delay circuit freely delays measured clock pulses generated by a voltage-controlled oscillator within a range of one clock pulse interval to make it possible to fine tune the frequency of the measured clock pulses. By counting down the fine-tuned measured clock pulses in the following oscillation circuit, a regenerative horizontal synchronizing signal phase-locked with the oscillation frequency is obtained.

In the following, the circuit shown in FIG. 1B is described.

The line lock clock pulse generation circuit 2 generates a line lock clock pulse signal 3 in synchronism with a horizontal synchronizing signal contained in a video signal supplied through the video signal input terminal 1.

Next, the synchronizing signal generation circuit 9 receives the line lock clock pulse signal 3 supplied from the line lock clock pulse generation circuit 2 and generates a synchronizing signal.

The signal processing circuit 10 receives both the video signal supplied through the video signal input terminal 1 and the line lock clock pulse signal 3 supplied from by the line lock clock pulse generation circuit 2 and performs signal processing on the video signal.

As an example of such a conventional circuit as shown in FIG. 1B, for example, there is that disclosed in JP-A-63-193783 specification.

That disclosed in the above JP-A-63-193783 specification relates to an n-fold speed scanning television receiver having a double speed horizontal synchronizing generation circuit and a double speed horizontal deflection circuit which are arranged in one phase lock circuit. In this conventional circuit, the input video signal is subjected to double speed conversion and double density scanning by using a digital circuit. Accordingly, the conventional circuit is suitable for the case where input signals of two systems (for example, a standard signal and a double speed signal) exist.

In recent years, development of television receivers has been activated to put into practice IDTV (improved definition television receivers) in which picture quality is improved by replacing the conventional analog signal processing video circuit by a digital signal processing video circuit.

A conventional clock generation and synchronizing deflection circuit used in the IDTV is shown in FIG. 2. In FIG. 2, the reference numeral 201 designates an input terminal, 202 a phase comparator (PD), 203 a low-pass filter (LPF), 204 a voltage-controlled oscillator (VCO), 205 a 1/910 frequency divider, 206 a horizontal output circuit, 207 a flyback transformer (FBT), and 208 and 209 ½ frequency dividers.

The horizontal synchronizing signal supplied to the input terminal 201 is compared with the output of the ½ frequency divider 208 supplied to the other input signal thereof inputted to the phase comparator 202 the result of comparison being put out as a signal corresponding to the phase difference between the two input signals. The output signal of the phase comparator 202 is filtered by the low-pass filter 203 so as to attain a predetermined response characteristic and then the output of the low-pass filter is supplied to the voltage-controlled oscillator 204. The voltage-controlled oscillator 204 generates a signal having an oscillation frequency corresponding to the output of the low-pass filter 203. The frequency of the output of the voltage-controlled oscillator 204 is divided into 1/910 by the 1/910 frequency divider 205 so as to produce a double speed horizontal synchronizing signal 205-output. At the same time, the horizontal synchronizing signal 205-output is supplied to the horizontal output circuit 206 to perform horizontal scanning. A deflection york drive signal for the horizontal scanning is amplified by the flyback transformer 207. The frequency of a flyback pulse signal generated in the secondary side of the flyback transformer is divided by the ½ frequency divider 208 and then supplied to the phase comparator 202. The circuits 202 to 208 constitute a feed-back control circuit for performing phase locking between the input signal supplied to the input terminal 201 and the output of the ½ frequency divider 208.

In order to perform digital signal processing, in addition to the 205-output which is equal in frequency to the output of the horizontal output circuit 206, the 209-output which is equal in period to the horizontal period of the input signal is obtained by dividing the frequency of output of the 1/910 frequency divider 205 into ½ by the ½ divider 209.

As an example of such a conventional technique, for example, there is that disclosed in JP-A-64-29174 specification.

That disclosed in the above JP-A-64-29174 specification relates to a clock pulse generation circuit in which, in FIG. 2, a horizontal synchronizing signal of a television receiver is supplied to a first phase lock circuit so as to produce a double speed horizontal pulse signal, and the double speed horizontal pulse signal is supplied to a second phase lock circuit so as to produce a desired clock pulse signal.

However, the respective conventional techniques have the following disadvantages.

The circuit shown in FIG. 1A has an advantage in that not only a very stable synchronizing signal can be generated but picture quality in the video signal can be improved, in the case where the video signal supplied to the video input terminal 1 is a standard signal.

However, the circuit has no consideration upon a signal out of standard (hereinafter called "non-standard signal") which is not strictly in accord with the standard with respect to the standard television broadcasting system, such as a video signal reproduced by a VTR (video tape recorder), that is to say, a signal which does not satisfy the relation expressed by the equation (1). Accordingly, in the case where such a non standard signal is supplied, there arises a problem in that not only the picture quality cannot be improved but the stability of phase lock cannot be attained.

On the other hand, the circuit shown in FIG. 1B has an advantage in that synchronization can be made sufficiently even in the case where a non-standard signal is supplied. Accordingly, the circuit can cope with video signals supplied from various appliances different in the pull-in range. Further, the picture quality can be improved within a range in which the relation is not used, because the relation expressed by the equation (1) is not kept as described above when a non-standard signal is supplied.

However, in the case where a standard signal satisfying the relation (1) is supplied, the picture quality cannot be improved sufficiently because the Q value of an oscillator (not shown) contained in the line lock clock pulse generation circuit 2 in the circuit of FIG. 1B is lower than that of a quartz oscillator contained in the burst lock clock generation circuit 4 in the circuit of FIG. 1A, and, accordingly, because the stability of the generated clock pulse signal in the circuit of FIG. 1B is lower than that in the circuit of FIG. 1A.

In the conventional technique as shown in FIG. 2, the Q value of the voltage-controlled oscillator 204 is generally established to be so low to answer video signals of various appliances in which the horizontal frequency is not exactly controlled. Accordingly, the clock pulse signal generated by the circuit shown in FIG. 2 is poor in stability. Accordingly, the jitter of the clock pulse signal is so large that the arrangement of picture elements with respect to lines and fields cannot be grasped exactly. Consequently, in the conventional technique shown in FIG. 2, the effect for improvement of picture quality is very small.

SUMMARY OF THE INVENTION

A main object of the present invention is to provide a clock pulse generator which can produce such a suitable clock pulse signal to a signal processing circuit that improvement of picture quality can be made regardless of the type of an input signal and which can produce such a suitable clock pulse signal to a synchronizing signal generating circuit that synchronization can be made easily even in the case where any non-standard signal enters and that a very stable synchronizing signal can be generated in the case where a standard signal is supplied.

Another object of the present invention is to provide a clock pulse generator in which disturbance due to beat as well as trouble due to jitter can be prevented when a standard signal is supplied and when a different clock pulse signal is given to the signal processing circuit.

A further object of the present invention is to provide a clock pulse generator in which a line lock clock pulse generating circuit to be used in the present invention is free from phase lock skipping, and, accordingly, free from the problem of phase lock discontinuity caused by the phase lock skipping.

A still further object of the present invention is to provide a clock pulse generator in which impulse noise can be suppressed.

In order to attain the foregoing objects, according to an aspect of the present invention, the clock pulse generator is provided with a first clock pulse generating means for generating a burst lock clock pulse signal synchronized with a color burst signal contained in a video signal, a second clock pulse generating means for generating a line lock clock pulse signal synchronized with a horizontal synchronizing signal contained in the video signal, a detection means for detecting whether the video signal accords with a predetermined standard or not (whether the video signal is a standard signal or not), and a phase control means for synchronizing the phase of the line lock clock pulse signal with the phase of the burst lock clock pulse signal when the detection means makes a decision that the video signal is a standard signal, the line lock clock pulse signal being supplied to a synchronizing signal generating means, selected one of the burst lock clock pulse signal and the line lock clock pulse signal being supplied to a signal processing circuit when the detection means makes a decision that the video signal is a standard signal, the line lock clock pulse signal being supplied to the signal processing means when the detection means makes a decision that the video signal is a non-standard signal.

In order to attain the foregoing objects, according to another aspect of the present invention, the clock pulse generator is provided with a first clock pulse generating means for generating a burst lock clock pulse signal synchronized with a color burst signal contained in a video signal, a second clock pulse generating means for generating a line lock clock pulse signal synchronized with a horizontal synchronizing signal contained in the video signal, a detection means for detecting whether the video signal accords with a predetermined standard or not, a delay means for delaying the output signal of the detection means to be after an equivalent pulse period of the video signal, a phase control means for synchronizing the phase of the second clock pulse signal with the phase of the first clock pulse signal when the detection means through the delay means makes a decision that the video signal accords with the standard, a selection means supplied with the first and second clock pulse signals and for selecting one of the first and second clock pulse signals in accordance with the result of the detection through the detection means, a synchronizing signal generating means for generating a synchronizing signal, and a signal processing means for performing signal processing, the second clock pulse signal being supplied to the synchronizing signal generating means, the output clock pulse signal from the selection means being supplied to the signal processing means.

In order to attain the foregoing objects, according to a further aspect of the present invention, the clock pulse generator is provided with a first clock pulse generating means for generating a first clock pulse signal synchronized with a color burst signal contained in a video signal, a suppressing means for suppressing an equivalent pulse signal contained in the video signal, a second clock pulse generating means for generating a second clock pulse signal synchronized with a horizontal synchronizing signal contained in the output signal of the suppressing means, a detection means for detecting whether the video signal accords with a predetermined standard or not, a phase control means for synchronizing the phase of the second clock pulse signal with the phase of the first clock pulse signal when the detection means makes a decision that the video signal accords with the standard, a selection means receiving the first and second clock pulse signals and selecting one of the first and second clock pulse signals corresponding to the result of the detection through the detection means, a synchronizing signal generating means for generating a synchronizing signal, and a signal processing means for performing signal processing, the output clock pulse signal from the selection means being supplied to the signal processing means.

Accordingly, according to the present invention, the detection means detects whether the video signal is a standard signal or not. The phase control means controls the line lock clock pulse signal to synchronize the phase thereof with the phase of the burst lock clock pulse signal only when the detection means makes a decision that the video signal is a standard signal.

When a non-standard signal is supplied, the line lock clock pulse signal is given to the signal processing means. When a standard signal is supplied, the burst lock pulse signal or the line lock clock pulse signal synchronized with the burst lock clock pulse signal is given to the signal processing means. Accordingly, the picture quality can be made high or improved in the signal processing means either in the case where a standard signal is supplied or in the case where a non-standard signal is supplied.

When a non-standard signal is supplied, the line lock clock pulse signal having a wide pull-in range is given to the synchronizing signal generating means. When a standard signal is supplied, the line lock clock pulse signal synchronized with the burst lock clock pulse signal is given to the synchronizing signal generating means. Accordingly, synchronization can be made easily in the synchronizing signal generating means even though any non-standard signal is supplied from various appliances different in the pull-in range. Further, in the case where a standard signal is supplied, a very stable synchronizing signal can be generated.

Further, according to the present invention, the phase control means is controlled based on a signal delayed by the delay means when the detection means makes a decision that the video signal is a standard signal. The phase control mean controls the line lock clock pulse signal to synchronize the phase thereof with the phase of the burst lock clock pulse signal.

When a non-standard signal is supplied, the line lock clock pulse signal is given to the signal processing means. When a standard signal is supplied, the burst lock clock pulse signal or the line lock clock pulse signal synchronized with the burst lock clock pulse signal is given to the signal processing means. Accordingly, a clock pulse signal most suitable for improvement of the picture quality can be given to the signal processing means either in the case where a standard signal is supplied or in the case where a non-standard signal is supplied, so that high picture quality can be attained.

When a non-standard signal is supplied, the line lock clock pulse signal having a wide pull-in range is given to the synchronizing signal generating means. When a standard signal is supplied, the line lock clock pulse signal synchronized with the burst lock clock pulse signal is given to the synchronizing signal generating means. Accordingly, synchronization can be made easily in the synchronizing signal generating means though any non-standard signal enters from various appliances different in the pull-in range. Further, in the case where a standard signal is supplied, a very stable synchronizing signal can be generated.

In the system according to the present invention, the control timing in the phase control is shifted out of the equivalent pulse period of the video signal through the delay means. Accordingly, the phase control is not made in a period in which the line lock clock pulse signal is disordered because of the equivalent pulse signal. Consequently, smooth clock pulse control can be made as will be describe later.

In the system according to the present invention, the equivalent pulse signal of the video signal is suppressed. Accordingly, the equivalent pulse signal does not exist, so that disorder of the line lock clock pulse signal does not occur. Consequently, smooth clock control can be made.

BRIEF DESCRIPTION OF THE DRAWINGS

Preferred embodiments of the present invention will now be described in conjunction with the accompanying drawings, in which:

FIGS. 1A and 1B are block diagrams respectively showing conventional clock pulse generators;

FIG. 14 is a block diagram of an equivalent pulse suppressing circuit used in the present invention.

DESCRIPTION OF THE PREFERRED EMBODIMENTS

A first embodiment of the present invention will be described with reference to FIG. 3.

Figure 2:
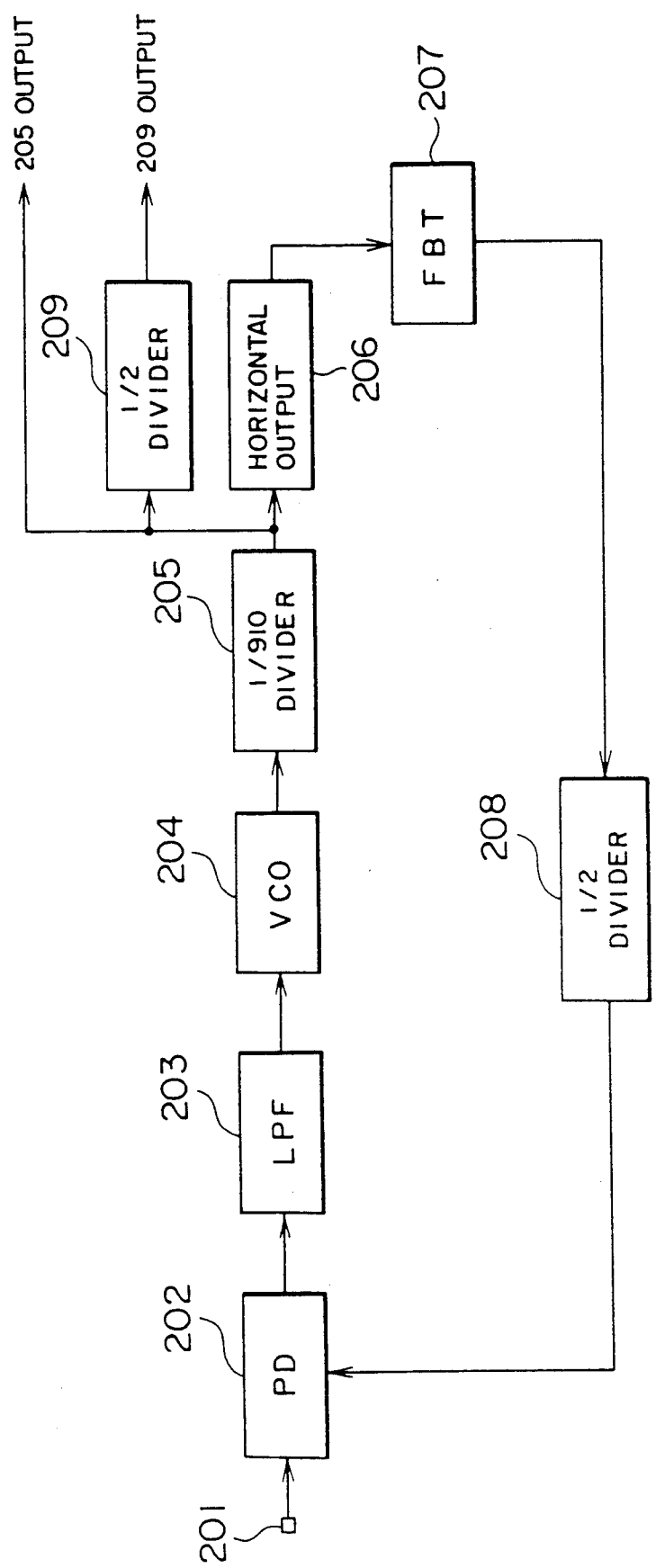
FIG. 2 is a block diagram of a conventional clock synchronizing deflection circuit.
Figure 3:
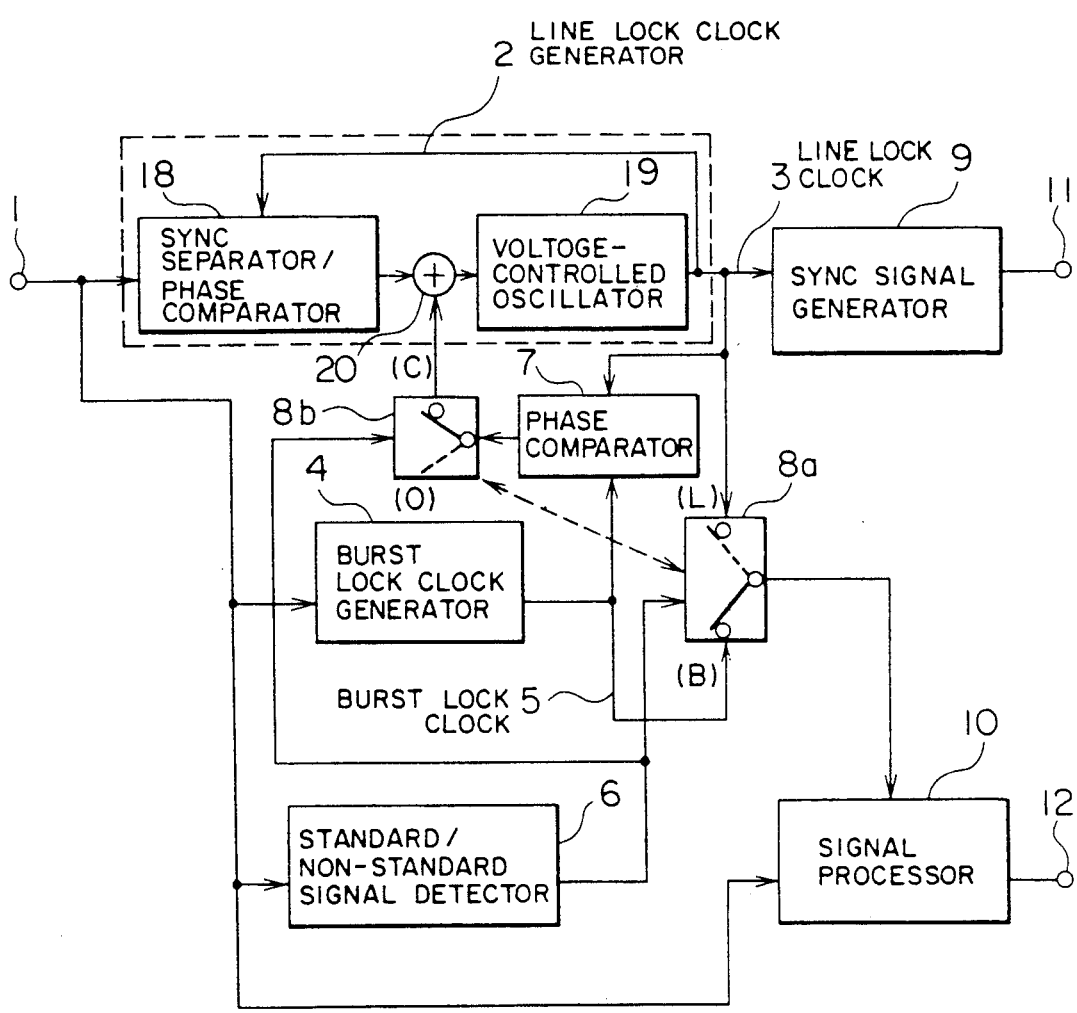
FIG. 3 is a block diagram showing a first embodiment of the present invention.

In FIG. 3, the reference numeral 1 designates a video signal input terminal, 2 a line lock clock pulse generation circuit, 3 a line lock clock pulse signal, 4 a burst lock clock pulse generation circuit, 5 a burst lock clock pulse signal, 8 a standard/non-standard signal detection circuit, 7 a phase comparator, 8a and 8b respectively switches, 9 a synchronizing signal generation circuit, 10 a signal processing circuit, 11 a synchronizing signal output terminal, 12 a video signal output terminal, 18 a synchronizing separation and phase comparison circuit, 19 a voltage-controlled oscillator, and 20 an adder.

In the following, the operation of the first embodiment of the present invention is described.

A video signal is supplied, through the video signal input terminal 1, to the line lock clock pulse generation circuit 2, to the burst lock clock pulse generation circuit 4, and to the standard/non-standard detection circuit 6. The line lock clock pulse generation circuit 2 separates a horizontal synchronizing signal contained in the video signal, and generates a line lock clock pulse signal 3 having a frequency 1820 times as high as the frequency $f_H$ of the horizontal synchronizing signal by using a phase-locked loop (PLL) circuit constituted by the synchronizing separation and phase comparison circuit 18, the adder 20, and the voltage-controlled oscillator 19.

On the other hand, the burst lock clock pulse generation circuit 4 extracts a color burst signal contained in the video signal and generates a burst lock clock pulse signal 5 having a frequency 8 times as high as the frequency $f_{SC}$ of the color burst signal by using a quartz oscillator (not shown) provided in the burst lock clock pulse generation circuit 4. Because the burst lock clock pulse signal 5 is generated by means of the quartz oscillator as described above, the burst lock clock pulse signal is very stable.

The synchronizing signal generation circuit 9 always receives the line lock clock pulse signal 3, generates a synchronizing signal in synchronism with the horizontal synchronizing signal of the input video signal by lowering the frequency of the clock pulse signal 3, and outputs the synchronizing signal through the synchronizing signal output terminal 11.

The standard/non-standard signal detection circuit 8 judges whether the frequency $f_H$ of the horizontal synchronizing signal of the input video signal and the frequency fsc of the color burst signal satisfy the relation expressed by the equation (1). In the case where the judgment proves that the relation expressed by the equation (1) is satisfied, the circuit makes a decision that the input video signal is a standard signal. In the case where the judgment proves that the relation expressed by the equation (1) is not satisfied, the circuit makes a decision that the input video signal is a non-standard signal. The circuit outputs the result of the judgment as a detection signal. As a known example of such a standard/non-standard signal detection circuit, for example, there is that disclosed in JP-A-61-184082 specification.

The circuit disclosed in the above JP-A-61-184082 specification relates to a video signal processing system in which a non-standard signal detection circuit discriminates a standard signal and a non-standard signal from each other by generating an output signal of a first value when the horizontal synchronizing signal component of the video signal has a frequency substantially in accordance with the ratio of the frequency of the horizontal synchronizing signal to the frequency of the color subcarrier signal which is set with respect to the adaptable signal standard while generating another output signal of another value when the frequency of the horizontal synchronizing signal component of the video signal discords with the above-mentioned ratio.

The switch 8a receives the detection signal supplied from the standard/non-standard signal detection circuit 6. In the case where the input video signal is a non-standard signal, the switch 8a is turned or closed to the line lock clock (L) side as shown by a broken line in the drawing. In the case where the input video signal is a standard signal, on the contrary, the switch is turned or closed to the burst lock clock (B) side as shown by a solid line in the drawing. Thus, either one of the line lock clock (L) and the burst lock clock (B) is supplied to the signal processing circuit 10. The signal processing circuit 10 further receives the video signal from the video signal input terminal 1 and performs digital signal processing by using the clock pulse signal supplied through the switch 8a to attain the improvement of the picture quality. The signal-processed video signal is sent out through the video signal output terminal 12.

In the following, the operation of the clock phase control is described.

The phase comparator 7 receives both the line lock clock pulse signal 3 and the burst lock clock pulse signal 5, compares the two signals with each other and supplies a signal corresponding to the phase difference between the line lock clock pulse signal 3 and the burst lock clock pulse signal 5 to the other switch 8b interlocked with the switch 8a. Similarly to the switch 8a, the operation of the switch 8b is controlled based on the detection signal generated by the standard/non-standard signal detection circuit. In the case where the input video signal is a standard signal, the switch 8b is turned to the C side so as to be closed as shown by a solid line in FIG. 3. In the case where the input video signal is a non-standard signal, on the contrary, the switch 8b is turned to the 0 side or so as to be opened as shown by a broken line in FIG. 3. Accordingly, the switch 8b serves to supply the output signal of the phase comparator 7 to the line lock clock pulse generation circuit 2 only when the input video signal is a standard signal.

Upon reception of the output signal from the phase comparator 7, the line lock clock pulse generation circuit 2 receives operates based on the received signal to make the phase of the line lock clock pulse signal 3 which is as an output signal thereof be in accord with the phase of the burst lock clock pulse signal 5.

In the following, the operation of the line lock clock pulse generation circuit 2 is described more in detail.

The synchronizing separation and phase comparison circuit 18 separates a horizontal synchronizing signal contained in the video signal supplied to the video signal input terminal 1, compares the phase of the separated horizontal synchronizing signal with the phase of the line lock clock pulse signal generated by the voltage-controlled oscillator 19, and supplies a voltage corresponding to the phase difference, as a control voltage, to the voltage-controlled oscillator 19 through the adder 20. The voltage-controlled oscillator 19 generates a frequency corresponding to the control voltage and outputs the oscillation output as a line lock clock pulse signal 3. Accordingly, when the switch 8b is opened so as to interrupt the output signal of the phase comparator 7, that is, when clock phase control is not carried out, the line lock clock pulse signal 3 is synchronized with the horizontal synchronizing signal.

On the contrary, when the switch 8b is closed so as to pass the output signal of the phase comparator 7, that is, when clock phase control is carried out, a comparison voltage, as an output signal, of the phase comparator 7 corresponding to the phase difference between the burst lock clock pulse signal 5 and the burst lock clock pulse signal 3 is added to the output control voltage of the synchronizing separation and phase comparison circuit 18 through the adder 20, and then the output of the adder 20 is supplied to the voltage-controlled oscillator 19. As a result, the phase of the line lock clock pulse signal 3 is made to be in accord with the phase of the burst lock clock pulse signal 5.

A second embodiment of the present invention will be described with reference to FIG. 4.

Figure 4:
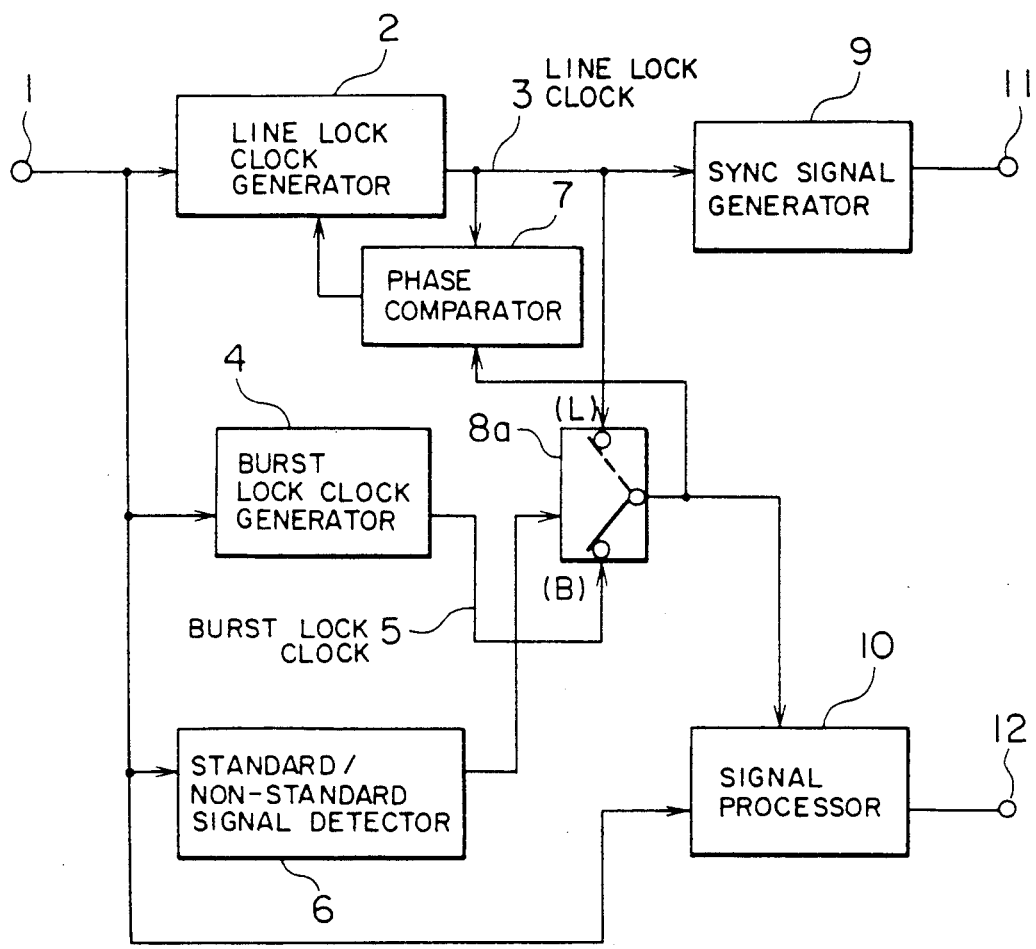
FIG. 4 is a block diagram showing a second embodiment of the present invention.

In FIG. 4, items the same as or equivalent to those in the first embodiment of FIG. 3 are referenced correspondingly.

The second embodiment shown in FIG. 4 is different from the first embodiment shown in FIG. 3 in the following points. In the second embodiment, the burst lock clock pulse signal 5 supplied from the burst lock clock pulse generation circuit 4 as an input signal to the phase comparator 7 in the first embodiment is replaced by a burst lock clock pulse signal supplied from the switch 8a. Further, in the second embodiment, the switch 8b is removed so that the output signal of the phase comparator 7 is directly supplied to the adder 20 (not shown in FIG. 4) of the line lock clock pulse generation circuit 2.

Accordingly, in the case where the video signal supplied through the video signal input terminal 1 is a standard signal, the phase comparator 7 compares the phase of the burst lock clock pulse signal 5 with the phase of the line lock clock pulse signal 3 to control the line lock clock pulse signal 3 to make the phase of the line lock clock pulse signal be in accord with the phase of the burst lock clock pulse signal 5. On the contrary, in the case where the input video signal is a non-standard signal, the line lock clock pulse signal 3 is supplied to both the two input terminals of the phase comparator 7 so that there is no phase difference, and, accordingly, there is no output signal in the adder 20 (not shown) of the line lock clock pulse generation circuit 2. Consequently, the line lock clock pulse signal is controlled so as to make the phase thereof be in accord with the phase of the burst lock clock pulse signal 5 only when the input video signal is a standard signal.

A third embodiment of the present invention well be described with reference to FIG. 5.

Figure 5:
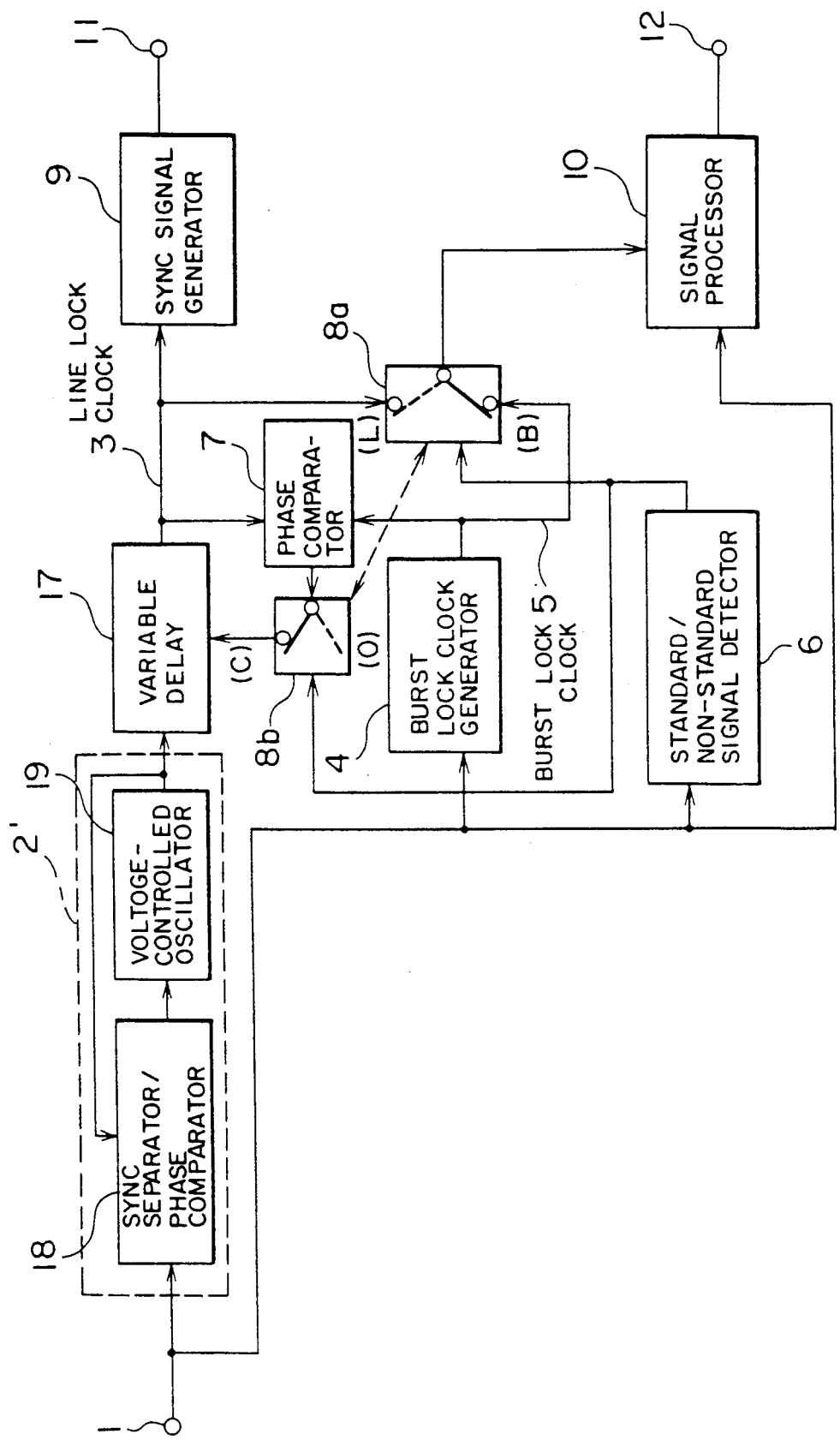
FIG. 5 is a block diagram showing a third embodiment of the present invention.

In FIG. 5, items the same as or equivalent to those in the first embodiment of FIG. 3 are referenced correspondingly. In FIG. 5, the reference numeral 2' designates a line lock clock pulse generation circuit constituted by a synchronizing separation and phase comparison circuit 18 and a voltage-controlled oscillator 19, and the reference numeral 17 designates a variable delay circuit.

The third embodiment shown in FIG. 5 is different from the first embodiment shown in FIG. 3 in the following points. In the third embodiment, the line lock clock pulse generation circuit 2 of the first embodiment is replaced by the line lock clock pulse generation circuit 2' provided with no adder 20. Further, in the third embodiment, the variable delay circuit 17 is provided so as to be supplied with the output of the switch 8b.

In the third embodiment, the line lock clock pulse generation circuit 2' generates a line lock clock pulse signal synchronized with the horizontal synchronizing signal contained in the video signal supplied through the video signal input terminal 1, by using a PLL circuit constituted by the synchronizing separation and phase comparison circuit 18 and the voltage-controlled oscillator 19.

The switch 8b operates in the same manner as in the embodiment in FIG. 3. In the case where the video signal supplied through the video signal input terminal 1 is a standard signal, the switch 8b is turned to the C side to be closed so as to supply the output signal of the phase comparator 7 to the variable delay circuit 17. In the case where the video signal is a non-standard signal, the switch 8b is turned to the 0 side so as to be opened to thereby interrupt the output signal of the phase comparator 7.

Upon reception of a voltage signal supplied from the switch 8b, the variable delay circuit 17 delays the line lock clock pulse signal supplied from the line lock clock pulse generation circuit 2' by time corresponding to the voltage supplied from the phase comparator 7. When there is no voltage supplied from the switch 8b, the variable delay circuit 17 passes the supplied line lock clock as it is with no delay.

Accordingly, the third embodiment pays attention upon the fact that the frequency of the line lock clock pulse signal generated from the line lock clock pulse generation circuit 2' is equal to the frequency of the burst lock clock pulse signal generated from the burst lock clock pulse generation circuit 4 in the case where the video signal supplied through the video signal input terminal 1 is a standard signal. In short, in the case of a standard signal, the line lock clock pulse signal supplied from the line lock clock pulse generation circuit 2' is delayed by the variable delay circuit 17 based on the output signal (a voltage corresponding to the phase difference between the line lock clock pulse signal and the burst lock clock pulse signal 5) of the phase comparator 7 supplied to the variable delay circuit 17 to thereby adjust only the phase of the line lock clock pulse signal to make the phase of the line lock clock pulse signal be in synchronism with the phase of the burst lock clock 5.

A fourth embodiment of the present invention will be described with reference to FIG. 6.

Figure 6:
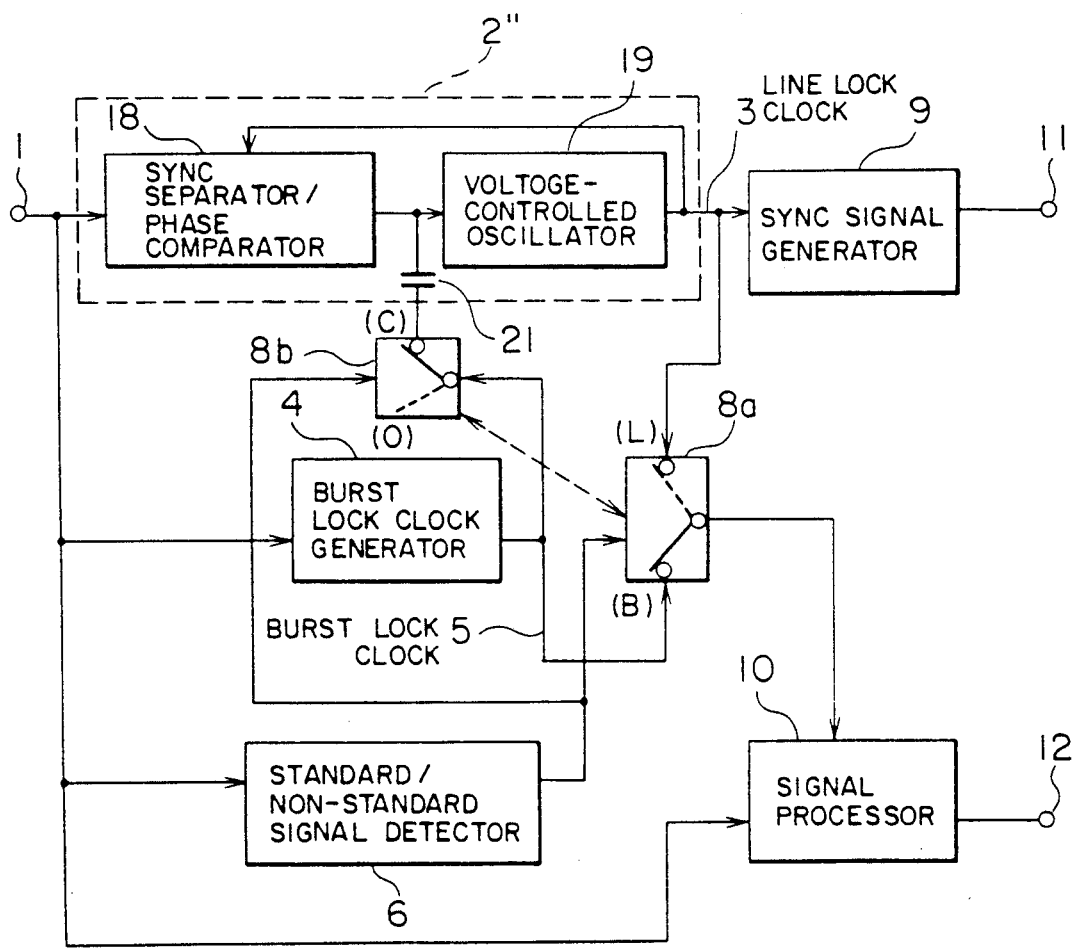
FIG. 6 is a block diagram showing a fourth embodiment of the present invention.

In FIG. 6, items the same as or equivalent to those in the first embodiment of FIG. 3 are referenced correspondingly. In FIG. 6, the reference numeral 2" designates a line lock clock pulse generation circuit constituted by a synchronizing separation and phase comparison circuit 18, a voltage-controlled oscillator 19, and a capacitor 21.

The fourth embodiment shown in FIG. 6 is different from the first embodiment shown in FIG. 3 in the following points. In the fourth embodiment, the line lock clock pulse generation circuit 2 of FIG. 3 is replaced by the line lock clock pulse generation circuit 2" so that the output of the switch 8b is supplied to the capacitor 21 which serves as an adder for adding an alternating current to a direct current. Further, in the fourth embodiment, the phase comparator 7 of FIG. 3 is removed so that the burst lock clock pulse signal 5 from the burst lock clock pulse generation circuit 4 is directly supplied to the switch 8b.

The switch 8b operates in the same manner as in the first embodiment in FIG. 3. In the case where the video signal supplied through the video signal input terminal 1 is a standard signal, the switch 8b is turned to the C side so a to be closed to thereby supply the burst lock clock pulse signal from the burst lock clock pulse generation circuit 4 to the voltage-controlled oscillator 19 through the capacitor 21. In the case where the video signal is a non-standard signal, the switch 8b is turned to the 0 side so as to be opened to thereby interrupt the signal output.

In the line lock clock pulse generation circuit 2", the synchronizing separation and phase comparison circuit 18 separates a horizontal synchronizing signal contained in the video signal supplied through the video signal input terminal 1 and compares the phase of the separated horizontal synchronizing signal with the phase of the line lock clock pulse signal 3 generated from the voltage-controlled oscillator 19 to thereby supply a voltage corresponding to the phase difference as a control voltage to the voltage-controlled oscillator 19. The voltage-controlled oscillator 19 generates a frequency corresponding to the control voltage and supplies the oscillation output as a line lock clock pulse signal 3. Accordingly, in the case where the switch 8b interrupts the burst lock clock pulse signal 5 from the burst lock clock pulse generation circuit 4 through the capacitor 21, the line lock clock pulse signal 3 is synchronized with the horizontal synchronizing signal.

On the contrary, in the case where the burst lock pulse signal 5 from the burst lock pulse generation circuit 4 is supplied through the capacitor 21, the burst lock pulse signal is superposed on the control voltage as an output signal of the synchronizing separation and phase comparison circuit 18. Accordingly, the line lock pulse signal 3, as an output of the voltage-controlled oscillator 19, is synchronized with the burst lock clock pulse signal 5. As to the operation of the capacitor 21, reference be made to Masamichi Shimura, "Nonlinear Circuit Theory" (Electronic Circuits Lecture No. 3), pages 69–74.

A fifth embodiment of the present invention will be described with reference to FIG. 7.

Figure 7:
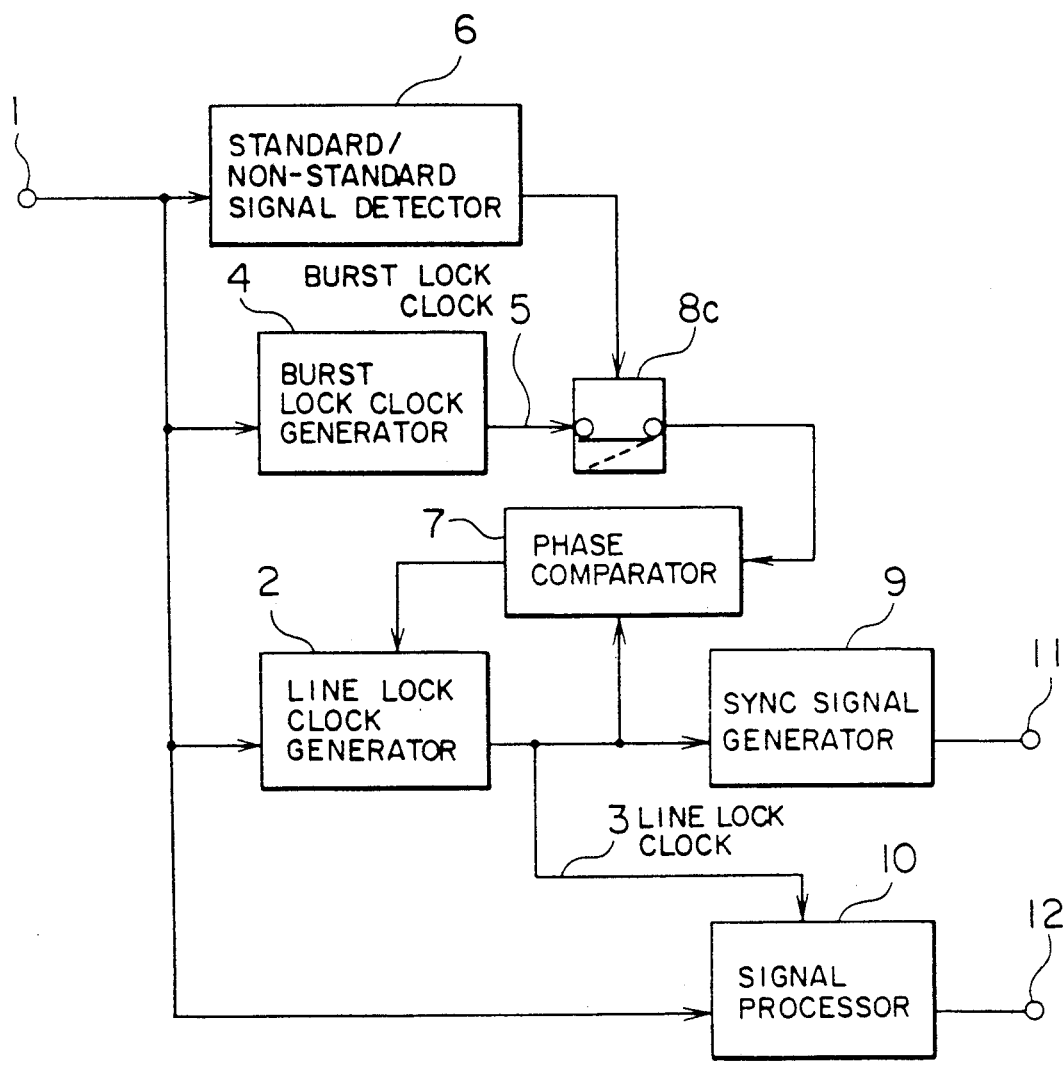
FIG. 7 is a block diagram showing a fifth embodiment of the present invention.

In FIG. 7, items the same as or equivalent to those in the first embodiment of FIG. 3 are referenced correspondingly. In FIG. 7, the reference numeral 8c designates a switch.

The operation of the fifth embodiment is different from the first embodiment shown in FIG. 3 in the following point. In the fifth embodiment, the signal processing circuit 10 as well as the synchronizing signal generation circuit 9 always operates based on the line lock clock pulse signal 3 generated from the line lock clock pulse generation circuit 2.

In the following, the operation of the fifth embodiment is described more in detail.

In the case where the video signal supplied through the video signal input terminal 1 is a non-standard signal, the switch 8c is turned to the 0 side so as to be opened so that the burst lock clock pulse signal from the burst lock clock pulse generation circuit 4 is not supplied to the phase comparator 7, and, accordingly, clock phase control is not carried out.

On the contrary, in the case where the video signal is a standard signal, the switch 8c is turned to the C side so as to be closed so that the burst lock clock pulse signal from the burst lock clock pulse generation circuit 4 is supplied to the phase comparator 7. Accordingly, the phase comparator 7 performs phase comparison between the burst lock clock pulse signal 5 and the line lock clock pulse signal 3 supplied from the line lock clock pulse generation circuit 5, so that a signal corresponding to the phase difference is supplied to the line lock clock pulse generation circuit 2. The line lock clock pulse generation circuit 2 operates based on the output signal of the phase comparator 7 to make the phase of the line lock clock pulse signal 3 be in accord with the phase of the burst lock clock pulse signal 5.

In the aforementioned embodiments, a wide synchronizing leading range is attained in the case where the video signal entering at the video signal input terminal 1 is a non-standard signal. Accordingly, the embodiments can be used for the wide purposes to give a line lock clock pulse signal 3 excellent in the tracking property against jitters or the like to both the synchronizing signal generation circuit 9 and the signal processing circuit 10. In the case where the video signal is a standard signal, the line lock clock pulse signal 3 synchronized with the burst lock clock pulse signal 5 to stabilize the line lock clock pulse signal is given to the synchronizing signal generation circuit 9. Further, the burst lock clock pulse signal 5 (or line lock clock pulse signal 3 in the fifth embodiment) is supplied to the signal processing circuit 10.

Accordingly, synchronization can be carried out in the synchronizing signal generation circuit 9 though any non-standard signal is supplied through the input terminal. Furthermore, in the case where the video signal is a standard signal, a very stable synchronizing signal can be generated. In addition, the signal processing circuit 10 can perform improvement of picture quality regardless of the type of the input signal as to whether the signal is a standard signal or not.

In the aforementioned embodiments except the fifth embodiment, different clock pulse signals are respectively given to the synchronizing signal generation circuit 9 and the signal processing circuit 10 in the case where the input signal is a standard signal. However, there arises no problem in beat trouble, jitter trouble and the like because the two clock pulse signals are synchronized with each other.

In the fifth embodiment, one clock pulse signal is supplied to both the synchronizing signal generation circuit 9 and the signal processing circuit 10. Accordingly, also in the fifth embodiment, there arises no problem in beat trouble, jitter trouble and the like.

A sixth embodiment will be described with reference to FIG. 8.

Figure 8:
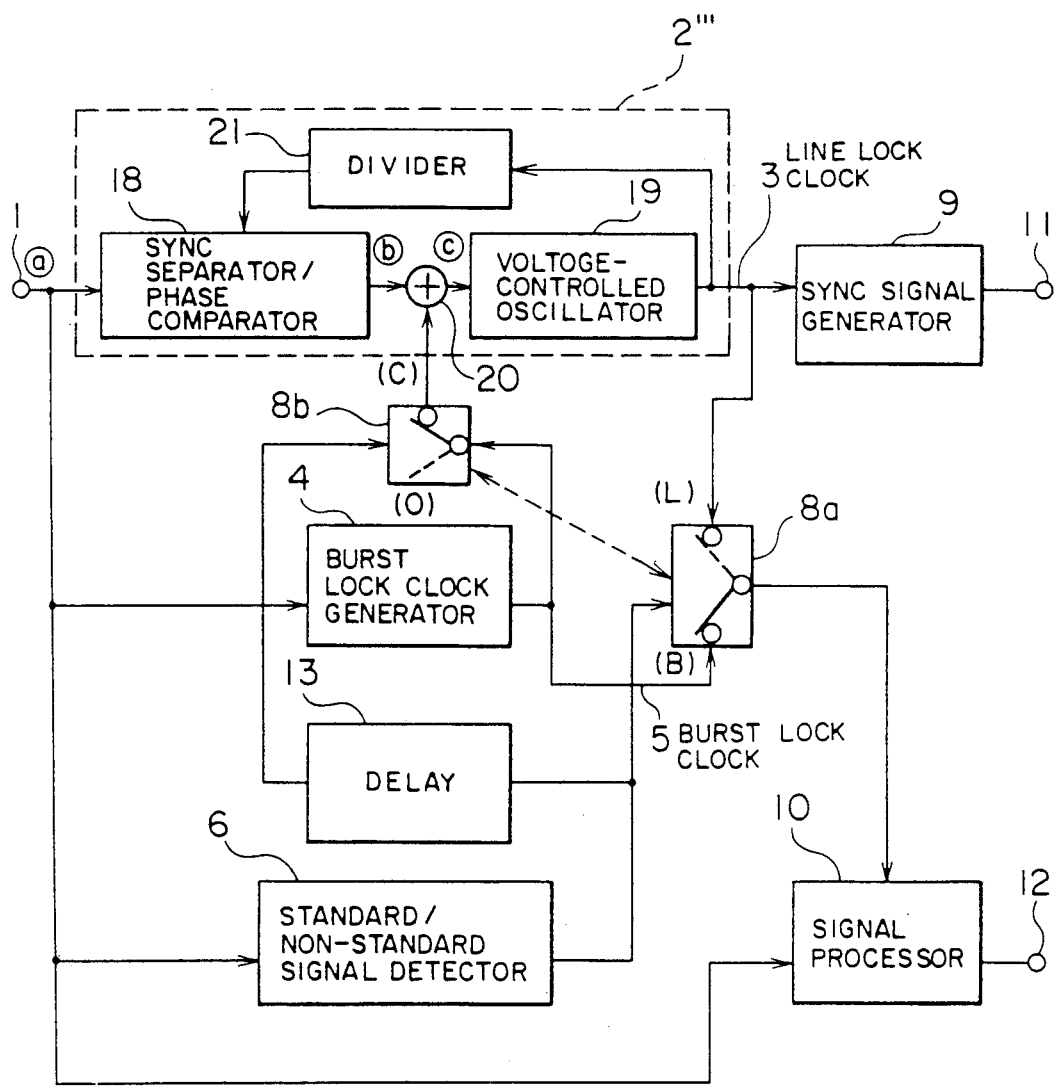
FIG. 8 is a block diagram showing a sixth embodiment of the present invention.

In FIG. 8, items the same as or equivalent to those in the first embodiment of FIG. 3 are referenced correspondingly. In FIG. 8, the reference numeral 2''' designates a line lock clock pulse generation circuit constituted by a synchronizing separation and phase comparison circuit 18, a voltage-controlled oscillator 19 and a frequency divider circuit 21. The reference numeral 13 designates a delay circuit.

The operation of the sixth embodiment as shown in FIG. 8 is different from that of the first embodiment as shown in FIG. 3 in the following point. The operation of the clock phase control is now described. The switch 8b as well as the switch 8a is controlled through the delay circuit 13 based on the detection signal supplied from the standard/non-standard signal detection circuit 6. In the case where the input video signal is a standard signal, the switch 8b is turned to the C side so as to be closed. In the case where the input video signal is a non-standard signal, the switch 8b is turned to the 0 side so as to be opened. Accordingly, the switch 8b serves to supply the burst lock clock pulse signal 5 to the line lock clock pulse generation circuit 2''' only when the input signal is a standard signal.

Upon reception of the burst lock clock pulse signal through the switch 8b, the line lock clock pulse generation circuit 2''' performs phase control to make the phase of the line lock clock pulse signal be in accord with the phase of the burst lock clock pulse signal 5.

In the following, the operation of the line lock clock pulse generation circuit 2''' is described more in detail.

In the line lock clock pulse generation circuit 2''', the synchronizing separation and phase comparison circuit 18 separates a horizontal synchronizing signal contained in the input video signal and compares the phase of the separated horizontal synchronizing signal with the phase of a signal obtained by dividing the frequency of the line lock clock pulse signal 3 supplied from the voltage-controlled oscillator 19 by using the frequency divider circuit 21 to thereby supply a voltage corresponding to the phase difference as a control voltage to the voltage-controlled oscillator 19 through the adder 20. The voltage-controlled oscillator 19 oscillates a frequency corresponding to the received control voltage and sends out the oscillation output as a line clock pulse signal 3. Accordingly, when the output signal is not given from the switch 8b, that is, when clock phase control is not carried out, the line lock clock pulse signal 3 is synchronized with the horizontal synchronizing signal.

On the other hand, when the output signal is supplied from the switch 8b, that is, when clock phase control is carried out, the burst lock clock pulse signal 5 supplied from the switch 8b is superposed upon the control voltage supplied from the synchronizing separation and phase comparison circuit 18. Accordingly, the phase of the line lock clock pulse signal 3 as an output signal of the voltage-controlled oscillator 19 is synchronized with the phase of the burst lock clock pulse signal 5. As to the operation of the aforementioned circuit, reference be made to Masamichi Shimura, "Nonlinear Circuit Theory" (Electronic Circuits Lecture No. 3), pages 69–74.

In the following, the phase control timing for the line lock clock pulse generation circuit 2''' based on the burst lock clock pulse signal 5 is described. The operation of the sixth embodiment of the present invention as shown in FIG. 8 is shown in FIG. 9.

First, the operation is described in the case where phase control is carried out in a video period.

Figure 9:
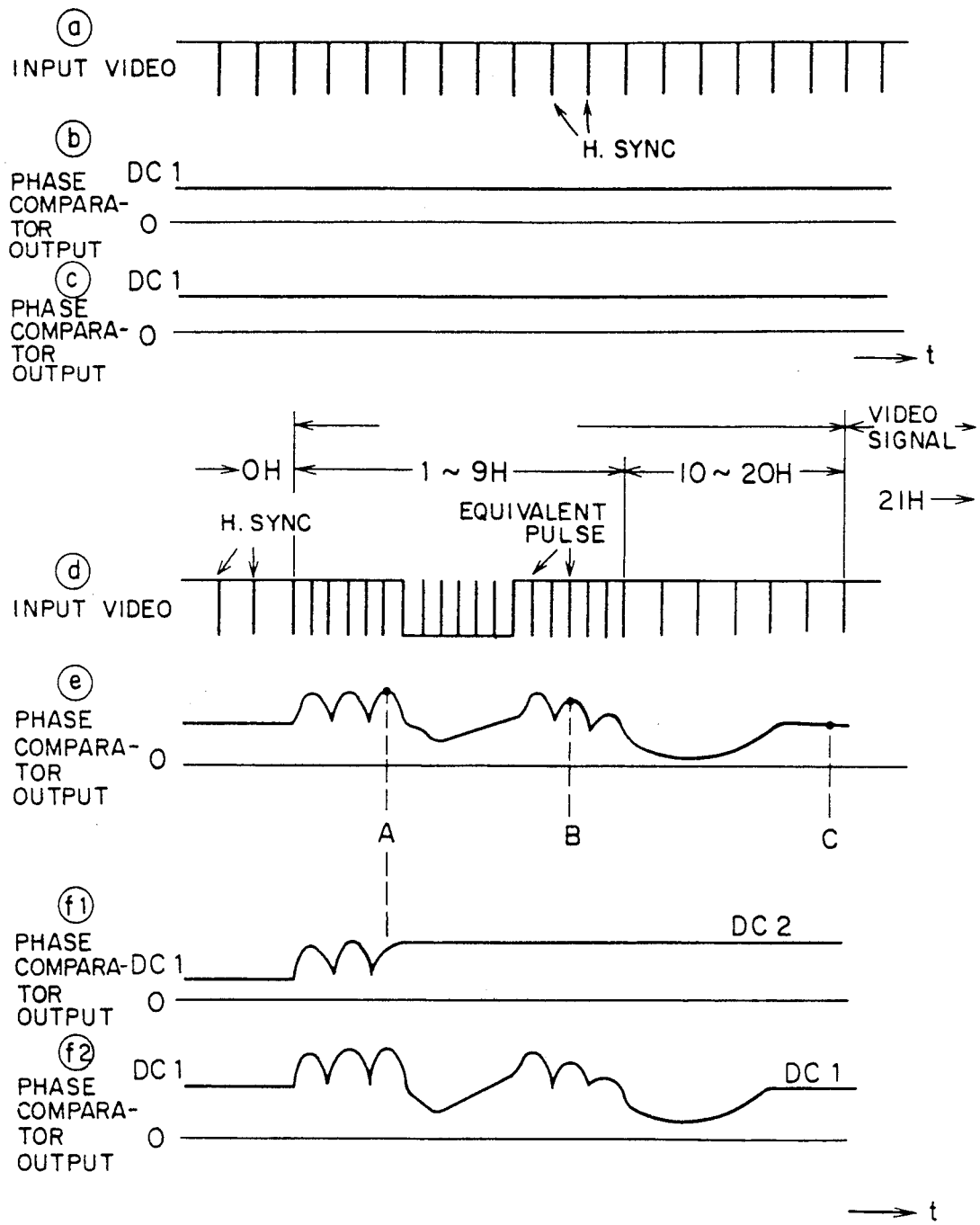
FIG. 9 is a view for explaining the operation of the clock pulse generating circuit according to the present invention depicted in FIG. 8.

The diagrams (a) to (c) of FIG. 9 show the operation waveforms in the video period. The diagram (a) of FIG. 9 is a waveform diagram of the input video signal. In the video period, there is no signal having the same level as that of the horizontal synchronizing signal such as an equivalent pulse signal or the like. The waveform of the output of the synchronizing separation and phase comparison circuit 18 is kept at a constant direct-current level DC1 as shown in the diagram (b) of FIG. 9. In this case, the direct-current level does not change through the burst lock clock pulse signal 5 is applied to the line lock clock pulse generation circuit 2''' through the switch 8b. Accordingly, the relation between the phase of the output of the frequency divider 21 and the phase of the video signal through the line lock clock pulse generation circuit does not change though phase control is carried out through the switch 8b.

On the contrary, when phase control is carried out in a vertical retrace period, waveforms as shown in the diagrams (d)–(f$_2$) of FIG. 9 are obtained. The diagram (d) of FIG. 9 shows a video signal in the vicinity of the vertical retrace period. When the switch 8b is kept turned to the 0 side so as to be in the opened state so that phase control based on the burst lock clock pulse signal 5 is not carried out, the waveform is greatly disordered in the vicinity of the equivalent pulse signal. If the switch 8b is turned to the C side so as to be closed at a point A in the diagram (e) of FIG. 9, the waveform of the output of the synchronizing separation and phase comparison circuit 18 changes as shown in the diagram (f$_1$) of FIG. 9 to keep the signal level at a constant direct-current level DC2 after the point A. This shows a state in which the line lock clock pulse generation circuit 2''', is balanced. At this time, the relation between the phase of the input video signal and the phase of the output of the frequency divider 21 changes from the relation before the phase control through the switch 8b and balanced in DC2 of the phase comparator output f$_1$. Accordingly, all synchronizing pulses generated based on the output of the frequency divider 21 change between the states before and after the phase control, so that the scene is shifted instantaneously horizontally. To avoid the problem, phase control through the switch 8b is carried out after the point C of time when the output of the synchronizing separation and phase comparison circuit 18 becomes constant. It is apparent from the drawings that the phase control can be made at suitable timing except the vicinity of the equivalent pulse signal. In this invention, the timing is attained by the delay circuit 13. In the following, the delay circuit 13 is described more in detail. For example, the delay circuit 13 is constituted by a D-type flip-flop circuit which has its D input connected to the output of the standard/non-standard signal detection circuit 6 and its clock input supplied with a vertical synchronizing pulse signal which rises at timing outside the equivalent pulse period. When the delay circuit 13 is constituted as described above, the aforementioned problem does not arise because the locked phase of the line lock clock pulse generation circuit 2''' does not change.

Figure 10:
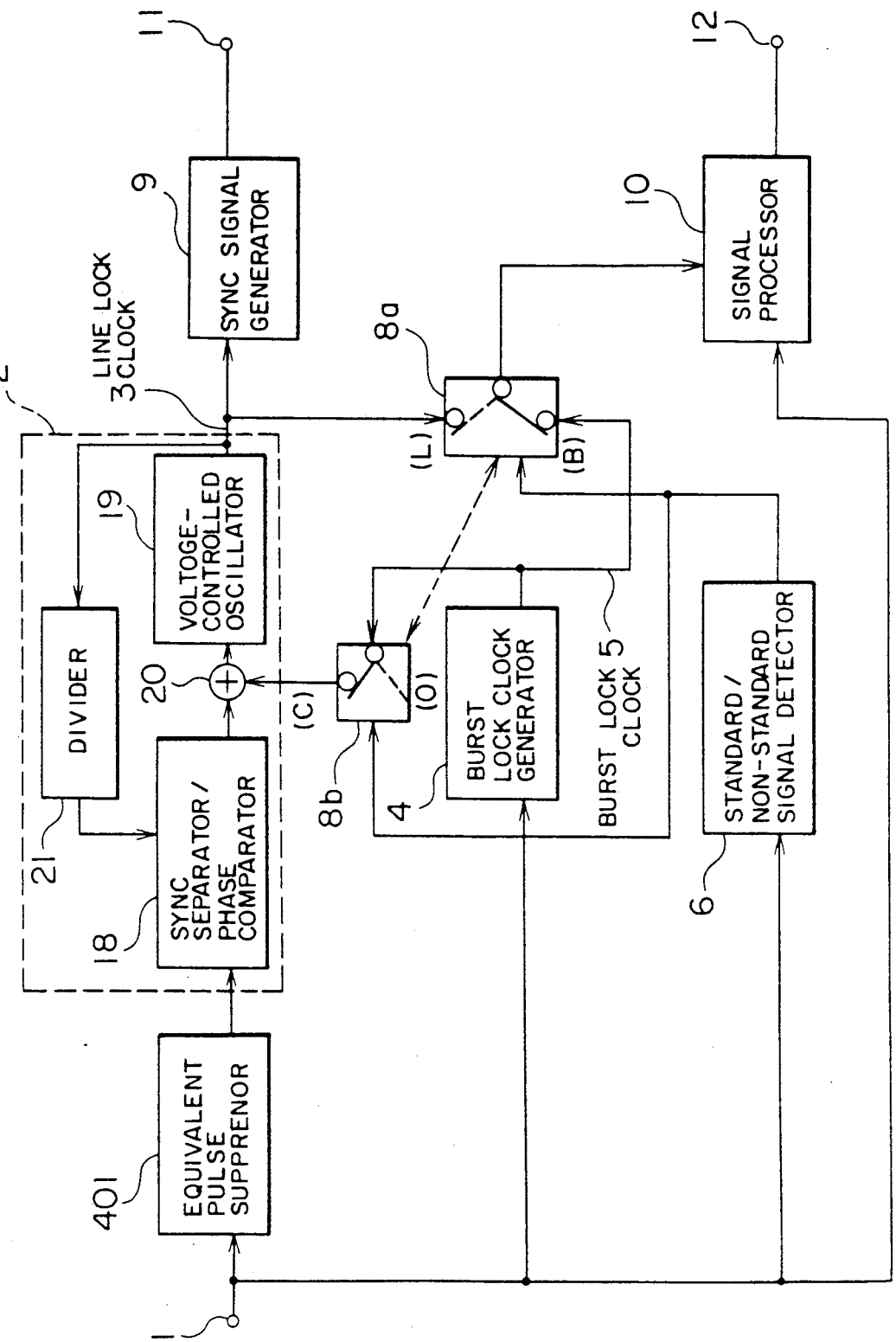
FIG. 10 is a block diagram showing a seventh embodiment of the present invention.

FIG. 10 shows a seventh embodiment of the present invention. In FIG. 10, items the same as or equivalent to those in the foregoing embodiment of FIG. 8 are referenced correspondingly. This embodiment of FIG. 10 is similar in configuration to the embodiment of FIG. 8 except that an equivalent pulse suppressing circuit 401 is provided in FIG. 10 and that the delay circuit 13 of FIG. 8 is not provided in FIG. 10.

In the following, the operation of the system of FIG. 10 is described with reference to FIG. 11. As described above, the problem in phase control timing is caused by performing phase control of the line lock clock pulse generation circuit 2''' based on the burst lock clock pulse signal in a period in which the output of the synchronizing separation and phase comparison circuit 18 is greatly disordered because of the equivalent pulse signal. Accordingly, if the equivalent pulse signal is suppressed and then supplied to the synchronizing separation and phase comparison circuit, the problem is eliminated. FIG. 10 is based o this thought.

Figure 11:
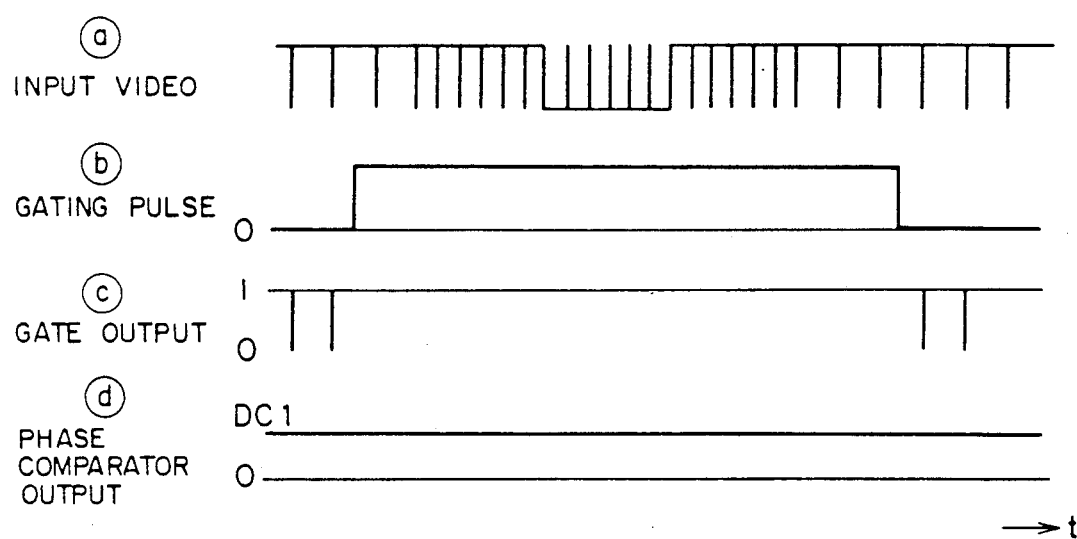
FIG. 11 is a view for explaining the operation of the clock pulse generating circuit according to the present invention depicted in FIG. 10.

In FIG. 10, a vertical gate pulse signal as shown in the diagram (b) of FIG. 11 is generated to suppress the equivalent pulse period. An output as shown in the diagram (c) of FIG. 11 is obtained by ORing the pulse signal and the video signal as shown in the diagram (a) of FIG. 11. At this time, the output of the synchronizing separation and phase comparison circuit 18 is kept at a direct-current level as shown in the diagram (d) of FIG. 11 so that the period of voltage disorder is eliminated. Accordingly, the problem in phase control timing is eliminated so that phase control can be made at any suitable timing.

Figure 12:
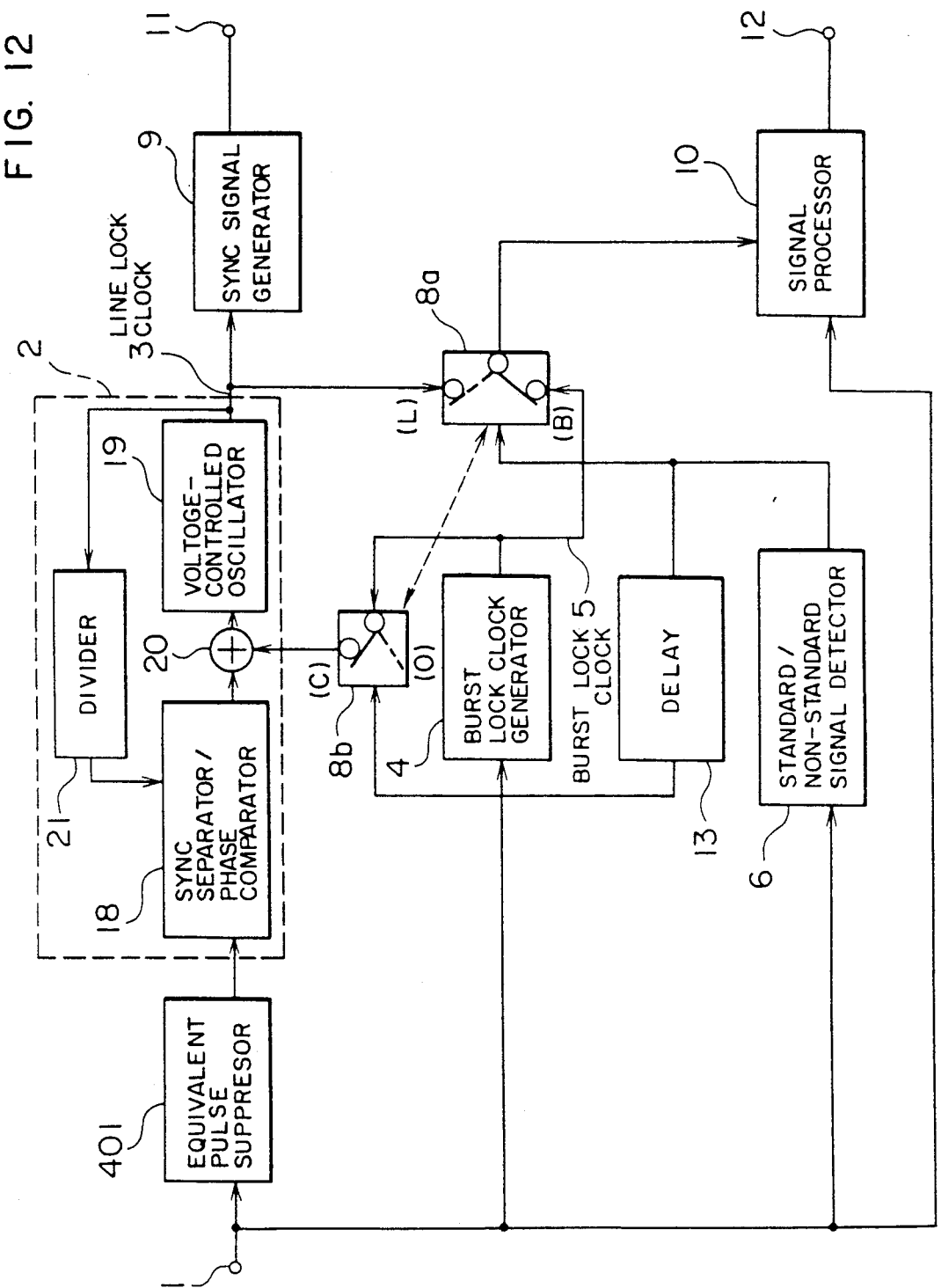
FIG. 12 is a block diagram showing an eighth embodiment of the present invention.

FIG. 12 shows an eighth embodiment of the present invention based on the same thought as described above in the seventh embodiment in FIG. 10. In FIG. 12, items the same as or equivalent to those in the seventh embodiment of FIG. 10 are referenced correspondingly. FIG. 12 is similar in configuration to FIG. 8 except that an equivalent pulse suppressing circuit 401 is provided in FIG. 12. In the following, the operation of the system of FIG. 12 is described with reference to FIG. 13.

Figure 13:
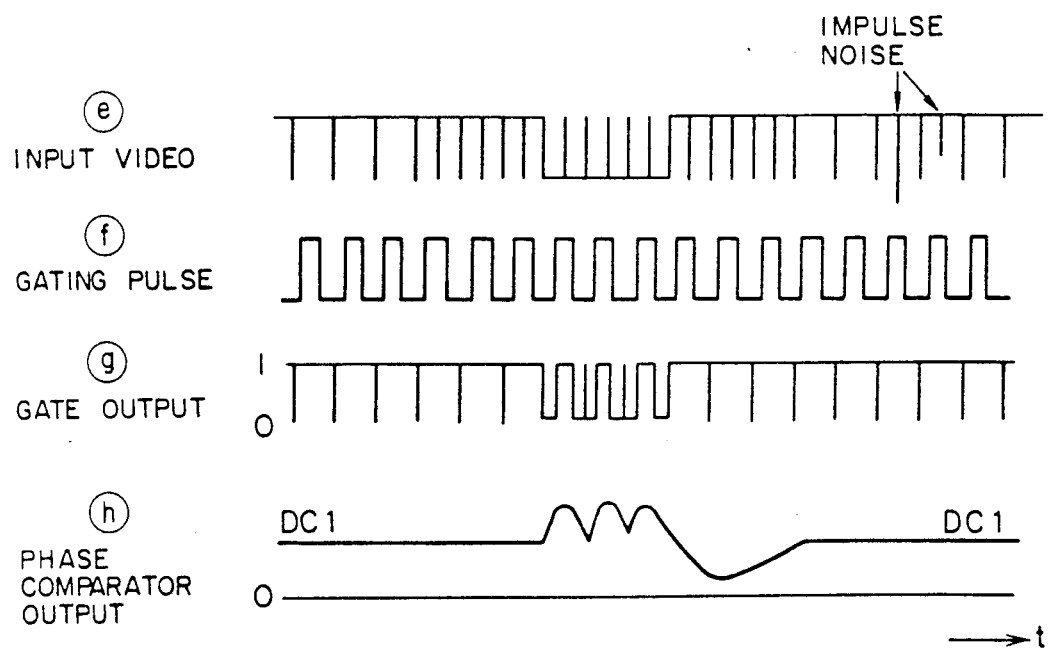
FIG. 13 is a view for explaining the operation of the clock pulse generating circuit according to the present invention depicted in FIG. 12.

In FIG. 12, a horizontal gate pulse signal as shown in the diagram (f) of FIG. 13 is generated to suppress the equivalent pulse period. An output as shown in the diagram (g) of FIG. 13 is obtained by ORing the pulse signal and the video signal as shown in the diagram (e) of FIG. 13. Accordingly, the disorder of the output of the synchronizing separation and phase comparison circuit 18 is reduced in the period in which the equivalent pulse signal is suppressed. And phase control can be made at any suitable time except the period of disorder. By constituting the system as shown in FIG. 12, the disorder of the output of the synchronizing separation and phase comparison circuit 18 caused by impulse noise as shown in the diagram (e) of FIG. 13 as well as the equivalent pulse signal can be suppressed.

A specific example of the equivalent pulse suppressing circuit 401 is shown in FIG. 14. The equivalent pulse suppressing circuit 401 includes a counter circuit which receives a clock pulse signal and counts the number of clock pulses till the counted number reaches a predetermined value. The output value of the counter circuit 4011 is decoded by the decoder circuit 4012 to attain a gate pulse waveform as shown in the diagram (b) of FIG. 11 or the diagram (f) of FIG. 13. The equivalent pulse signal is suppressed by ORing the gate pulse waveform and the input video signal in the OR circuit 4013.

Although the aforementioned embodiment has shown the case where the equivalent pulse signal is suppressed before synchronizing separation, it is a matter of course that the present invention can be applied to the case where the equivalent pulse signal may be suppressed after synchronizing separation as long as the equivalent pulse signal can be suppressed before phase comparison.

In the present invention, the phase of the line lock clock pulse signal is synchronized with the phase of the burst lock clock pulse signal only when the video signal is a standard signal.

When the video signal is a non-standard signal, the line lock clock pulse signal is given to the signal processing circuit. On the contrary, when the video signal is a standard signal, the burst lock clock pulse signal or the line lock clock pulse signal synchronized with the burst lock clock pulse signal is given to the signal processing circuit. Accordingly, there arises an effect that the picture quality can be improved regardless of the type of the input signal as to whether the signal entering into the signal processing circuit is a standard signal or not.

When the video signal is a non-standard signal, the line lock clock pulse signal is given to the synchronizing signal generation circuit. On the contrary, when the video signal is a standard signal, the line lock clock pulse signal synchronized with the burst lock clock pulse signal is given to the synchronizing signal generation circuit. Accordingly, there arises an effect that synchronization can be made though any non-standard signal supplied to the synchronizing signal generation circuit and that a very stable synchronizing signal can be generated in the case where a standard signal is supplied.

In the case where a standard signal is supplied, two different clock pulse signals, that is, the burst lock clock pulse signal and the line lock clock pulse signal, may be respectively given to the signal processing circuit and the synchronizing signal generation circuit. However, in the case where a standard signal is supplied, the clock pulse signals are synchronized with each other. There arises an effect that the problem in beat trouble, jitter trouble and the like can be avoided.

Further, the phase lock control to the line lock clock pulse signal based on the burst lock clock pulse signal after the standard signal detection is made out of the equivalent pulse period of the input signal. Accordingly, there arises an effect that lock phase skipping of the like lock clock pulse generation circuit can be prevented and that synchronization can be made continuously.

Further, the present invention can be designed to suppress the equivalent pulse period of the input video signal. Accordingly, there arises an effect that lock phase skipping of the like lock clock pulse generation circuit can be prevented at the time of the phase control of the line lock clock pulse signal based on the burst lock clock pulse signal after the standard signal detection and that synchronization can be made continuously.

As described above, the present invention can be designed to suppress the equivalent pulse period of the input video signal to thereby mask signals except the horizontal synchronizing signal. Accordingly, there arises an effect that impulse noise can be suppressed. Accordingly, there arises an effect that lock phase skipping of the line lock clock pulse generation circuit caused by the impulse noise as well as the equivalent pulse signal can be prevented.

We claim:

1. A clock pulse generator comprising:
   a first clock pulse generating means for generating a first clock pulse signal synchronized with a color burst signal contained in a video signal;
   a second clock pulse generating means for generating a second clock pulse signal synchronized with a horizontal synchronizing signal contained in said video signal;
   a detection means for detecting whether said video signal accords with a predetermined standard or not;
   a phase control means for synchronizing the phase of said second clock pulse signal with the phase of said first clock pulse signal when said detection means makes a decision that said video signal accords with said standard;
   a selection means supplied with said first and second clock pulse signals and for selecting one of said first and second clock pulse signals in accordance with the result of the detection through said detection means; and
   said second clock pulse signal being supplied to a synchronizing signal generating means to make said synchronizing signal generating means generate a synchronizing signal based on said second clock pulse signal, the selected clock pulse signal being supplied from said selection means to a signal processing circuit to make said signal processing circuit perform signal processing upon said video signal based on said selected clock pulse signal.

2. A clock pulse generator comprising:
   a first clock pulse generating means for generating a first clock pulse signal synchronized with a color burst signal contained in a video signal;
   a second clock pulse generating means for generating a second clock pulse signal synchronized with a horizontal synchronizing signal contained in said video signal;
   a detection means for detecting whether said video signal accords with a predetermined standard or not;
   a phase control means for synchronizing the phase of said second clock pulse signal with the phase of said first clock pulse signal when said detection means makes a decision that said video signal accords with said standard; and
   said second clock pulse signal being supplied to a synchronizing signal generating means to make said synchronizing signal generating means generate a synchronizing signal based on said second clock pulse signal, said second clock pulse signal being supplied to a signal processing circuit to make said signal processing circuit perform signal processing upon said video signal based on said second clock pulse signal.

3. A clock pulse generator according to claim 1, in which said phase control means includes a switching means for switching over between phase synchronization and phase asynchronization of said second clock pulse signal with said first clock pulse signal based on the result of the detection through said detection means.

4. A clock pulse generator according to claim 2, in which said phase control means includes a switching means for switching over between phase synchronization and phase asynchronization of said second clock pulse signal with said first clock pulse signal based on the result of the detection through said detection means.

5. A clock pulse generator according to claim 1, in which said second clock pulse generating means includes an oscillation means for performs oscillation in synchronism with the horizontal synchronizing signal contained in said video signal so as to output said second clock pulse signal as its oscillation output, and in which when the phase of said second clock pulse signal is synchronized with the phase of said first clock pulse signal, said phase control means directly controls said oscillation means so as to make the phase of said second clock pulse signal be synchronized with the phase of said first clock pulse signal.

6. A clock pulse generator according to claim 2, in which said second clock pulse generating means includes an oscillation means for performing oscillation in synchronism with the horizontal synchronizing signal contained in said video signal so as to output said second clock pulse signal as its oscillation output, and in which when the phase of said second clock pulse signal is synchronized with the phase of said first clock pulse signal, said phase control means directly controls said oscillation means so as to make the phase of said second clock pulse signal be synchronized with the phase of said first clock pulse signal.

7. A clock pulse generator according to claim 1, in which when the phase of said second clock pulse signal is synchronized with the phase of said first clock pulse signal, said phase control means controls the phase of said second clock pulse signal outputted from said second clock pulse generating means so as to make the phase of said second clock pulse signal be synchronized with the phase of said first clock pulse signal.

8. A clock pulse generator according to claim 2, in which when the phase of said second clock pulse signal is synchronized with the phase of said first clock pulse signal, said phase control means controls the phase of said second clock pulse signal outputted from said second clock pulse generating means so as to make the phase of said second clock pulse signal be synchronized with the phase of said first clock pulse signal.

9. A clock pulse generation circuit comprising:
   a first clock pulse generating means for generating a first clock pulse signal synchronized with a color burst signal contained in a video signal;
   a second clock pulse generating means for generating a second clock pulse signal synchronized with a horizontal synchronizing signal contained in said video signal;
   a detection means for detecting whether said video signal accords with a predetermined standard or not;
   a delay means for delaying the output signal of said detection means so that said output signal does not include an equivalent pulse period of said video signal;
   a phase control means for synchronizing the phase of said second clock pulse signal with the phase of said first clock pulse signal when said detection means through said delay means makes a decision that said video signal accords with said standard;
   a selection means supplied with said first and second clock pulse signals and for selecting one of said first and second clock pulse signals in accordance with the result of the detection through said detection means;
   a synchronizing signal generating means for generating a synchronizing signal;

a signal processing means for performing signal processing; and said second clock pulse signal being supplied to said synchronizing signal generating means, the output clock pulse signal from said selection means being supplied to said signal processing means.

10. A clock pulse generation circuit comprising:
a first clock pulse generating means for generating a first clock pulse signal synchronized with a color burst signal contained in a video signal;
a suppressing means for suppressing an equivalent pulse signal contained in said video signal;
a second clock pulse generating means for generating a second clock pulse signal synchronized with a horizontal synchronizing signal contained in the output signal of said suppressing means;
a detection means for detecting whether said video signal accords with a predetermined standard or not;
a phase control means for synchronizing the phase of said second clock pulse signal with the phase of said first clock pulse signal when said detection means makes a decision that said video signal accords with said standard;
a selection means supplied with said first and second clock pulse signals and for selecting one of said first and second clock pulse signals in accordance with the result of the detection through said detection means;
a synchronizing signal generating means for generating a synchronizing signal;
a signal processing means for performing signal processing; and
said second clock pulse signal being supplied to said synchronizing signal generating means, the output clock pulse signal from said selection means being supplied to said signal processing means.

11. A clock pulse generation circuit according to claim 10, in which said suppressing means performs suppression based on a vertical synchronizing pulse signal of said video signal.

12. A clock pulse generation circuit comprising:
a first clock pulse generating means for generating a first clock pulse signal synchronized with a color burst signal contained in a video signal;
a suppressing means for suppressing an equivalent pulse signal contained in said video signal;
a second clock pulse generating means for generating a second clock pulse signal synchronized with a horizontal synchronizing signal contained in the output signal of said suppressing means;
a detection means for detecting whether said video signal accords with a predetermined standard or not;
a delay means for delaying the output signal of said detection means so that said output signal does not include the vicinity of an equivalent pulse period of said video signal;
a phase control means for synchronizing the phase of said second clock pulse signal with the phase of said first clock pulse signal when said detection means through said delay means makes a decision that said video signal accords with said standard;
a selection means supplied with said first and second clock pulse signals and for selecting one of said first and second clock pulse signals in accordance with the result of the detection through said detection means;
a synchronizing signal generating means for generating a synchronizing signal; and
a signal processing means for performing signal processing, said signal processing means being supplied with the output clock pulse signal from said selection means.

* * * * *